Aug. 16, 1960 E. J. SCHUBERT 2,949,231

ARITHMETIC UNIT FOR FLOATING RADIX NOTATION

Filed Feb. 24, 1958 2 Sheets-Sheet 1

United States Patent Office 2,949,231
Patented Aug. 16, 1960

2,949,231

ARITHMETIC UNIT FOR FLOATING RADIX NOTATION

Ernest J. Schubert, Berwyn, Pa., assignor to Westinghouse Electric Corporation, East Pittsburgh, Pa., a corporation of Pennsylvania Filed Feb. 24, 1958, Ser. No. 717,192

3 Claims. (Cl. 235—177)

This invention relates to an arithmetic unit for a floating radix notation or more particularly to a circuit for comparing two values prior to an addition or subtraction with respect to the relative order of magnitude of the expressions without useless manipulations.

The use of an arithmetic unit in computer systems allows the comparison of digital expressions without providing separate subroutines and dynamic sequential control. The arithmetic unit comparison allows the elimination of one of the digital expressions where the expression is negligible with respect to the other digital expression to which it was supposed to be added. This is an advantage since the elimination occurs without providing a complete subroutine for the computer system in which the expression would be added without a sufficient change in the major expression occurring due to the negligible digital expression.

It is an object of this invention to provide an arithmetic unit capable of eliminating subroutine functions in a computer by comparing significant digits of two digital expressions and adding or augmenting the expressions.

It is another object of this invention to provide an arithmetic unit capable of comparing two digital expressions and eliminating one of the expressions if the other is large in comparison.

It is another object of this invention to provide an arithmetic unit capable of comparing the most significant digits of the scale factor of each of two digital expressions for repositioning the expressions to proper relationships capable of allowing addition of the expressions.

It is another object of this invention to provide an arithmetic unit capable of comparing two digital expressions and if the expressions are identical, add them directly for further use.

Other objects, purposes and characteristic features will become obvious as the description of the invention progresses.

In practicing this invention, a comparator of a matrix of any type is placed in a position to compare the scale factors of two digital expressions to determine whether the two expressions can be added as they appear or repositioned to a new position for addition or whether one of the expressions can be eliminated in view of the fact that its most significant digit is of lower order than the least significant digit of the other expression to which it is to be added. The comparator interposed between the two digital storage registers provides the necessary comparison and control of the two digital registers to provide proper adding of the expressions to present a single output result.

Figure 2A:
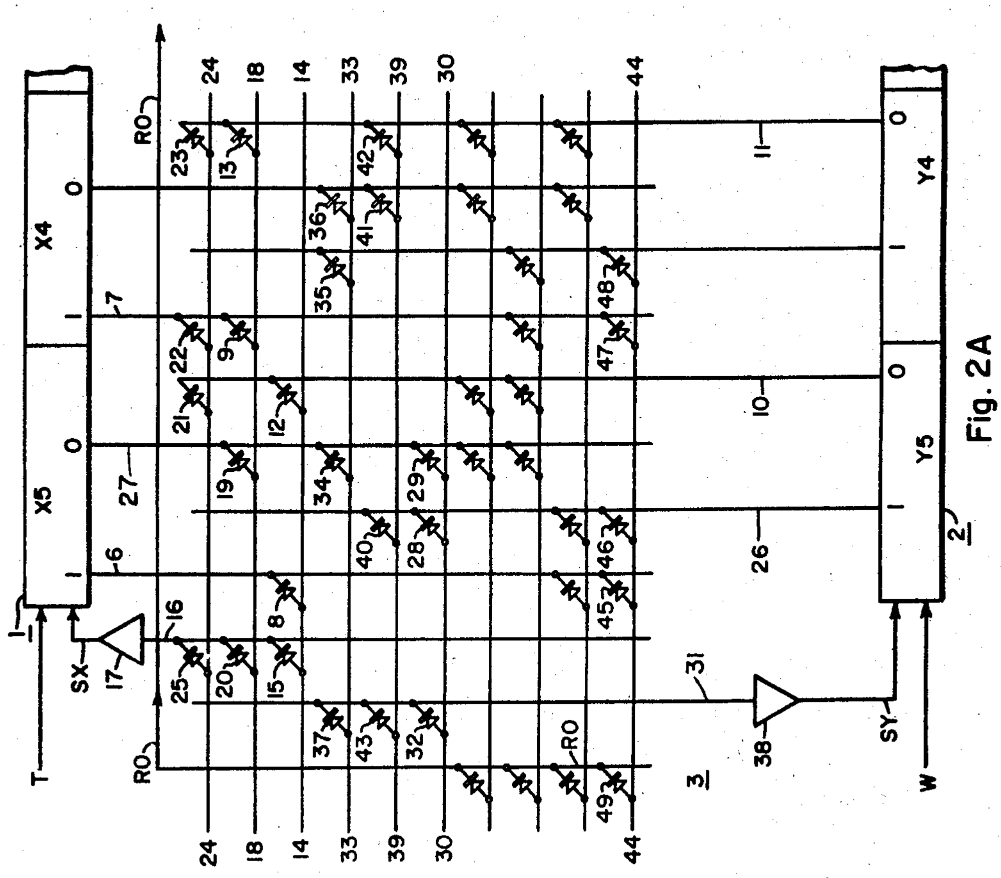
Figure 1:
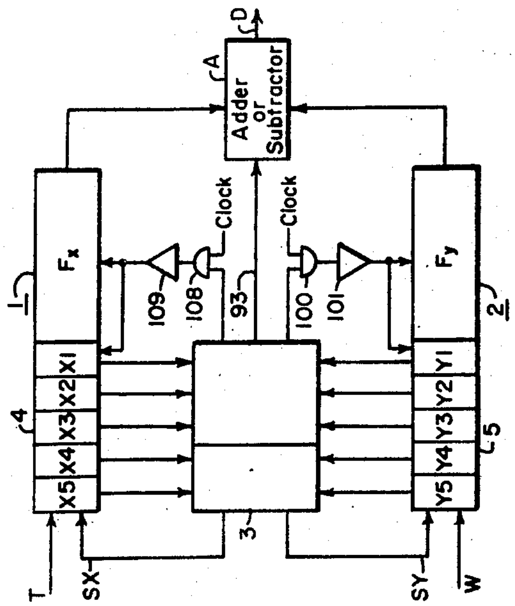
Figure 2B:
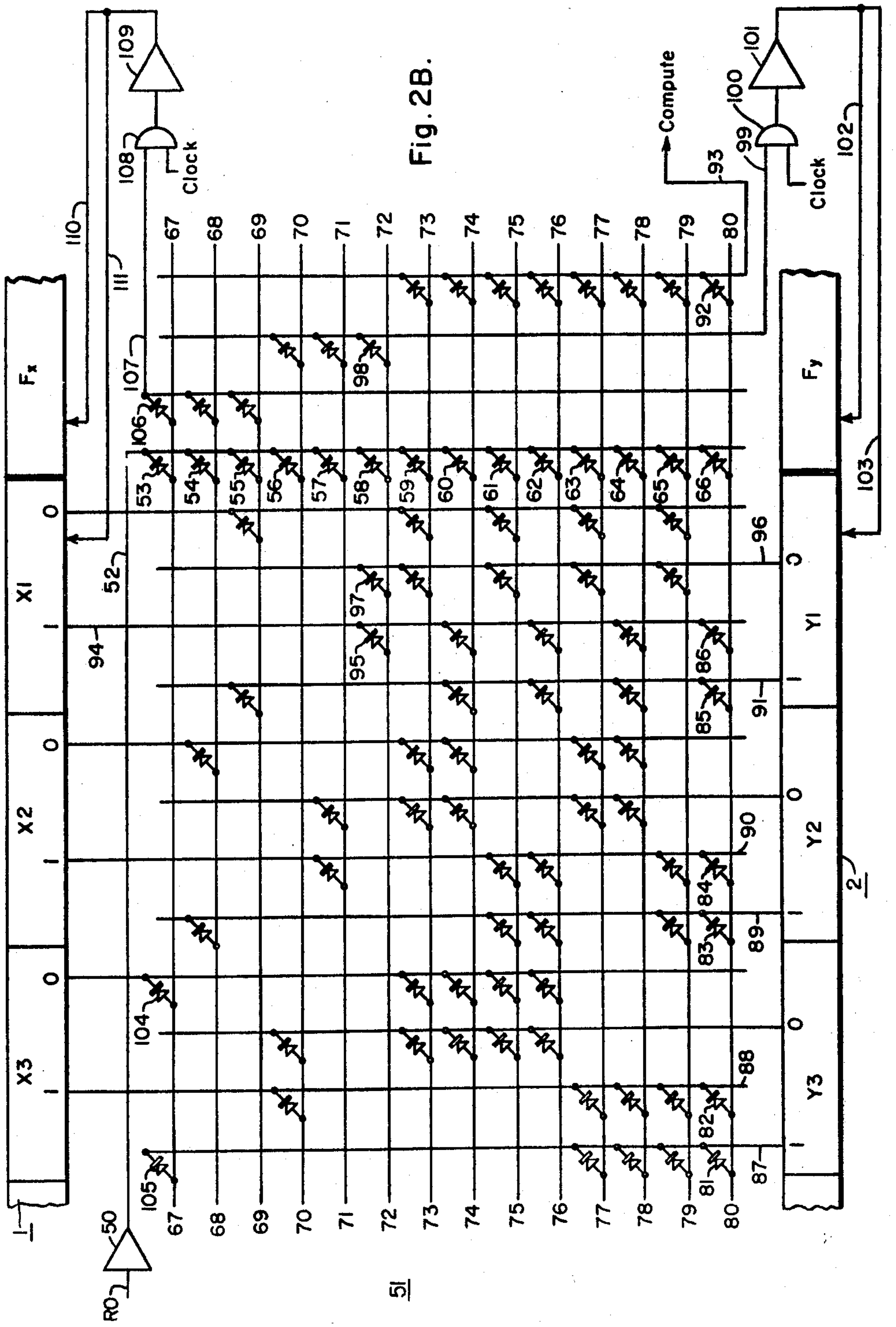

Figure 1 is a diagrammatic showing of the relationship of two digital registers and a comparator connected thereto;

Fig. 2*a* is a detailed view of the arrangement of the comparator for bits 4 and 5 of Fig. 1; and Fig. 2*b* is a detailed view of the arrangement of the comparator for bits 1 through 3 of Fig. 1.

In each of the several views similar parts bear like reference characters.

The logic to be performed in the comparator is best explained by reference to the following numerical examples. To perform an addition (or substraction) of X, Y several cases may be considered if dealing with quantities in a floating binary notation and a limited number of significant bits, e.g., eight bits $$X=2^a.F_x$$
$$Y=2^b.F_y$$
$$Z=X+Y=2^c.F_z$$

*a, b, c* scale factors, $F_x$, $F_y$, $F_z$ fractions

In the following examples scaled notation is used throughout with the scale factor preceding the fraction both being separated by ′ to distinguish this notation from a radix point.

(I) No arithmetic to be performed of $X>>Y$ if:

$$X=2^{18}.F_x=10010'10000101$$
$$Y=2^7.F_y=00111'11001100$$

In order to rescale Y to the same scale factor as X, $F_y$ has to be shifted to the right eleven places causing the most significant one to be disregarded $$Y=2^{18}.0=10010'00000000$$
$$Z=X+Y=X=10010'10000101$$

(II) An arithmetic operation can be performed if the fraction $F_y \neq 0$ following the adjustment of the scale factor *c*:

$$X=2^{23}.F_x=10111'10000101$$
$$Y=2^{17}.F_y=10001'11001011$$

In order to rescale Y the same scale factor as X, the scale factors *a* and *b* must be equal. Multiplying the scale factor *b* with $2^6$ required a division of the scale factor $F_y$ by the same number:

$$Y=2^{17}.F_y=2^{23}.(F_y/2^6)$$

Because the fractions comprise eight significant bits only, an adjustment of scale factors can be successful in those cases where the bits higher than the thirds of the scale factor coincide. Accordingly, a repositioning command for one or both fractions may be generated if scale factors differ in the three lowest bits only. Repositioning is performed by shifting the fraction of the smaller number to the right while counting the shift pulses to the scale factor until coincidence in all bits is established. This takes place at the end of the sixth shift pulse, and the command ceases automatically then.

$$Y=10111'00000011$$
$$Z=X+Y=10111'10001000$$

The structure will now be described.

If we assume that in a digital computer, we have two expressions being sequenced into the registers 1 and 2 over the conductors T and W, respectively, for comparison and addition or subtraction to provide an output result, the comparator 3 is provided for comparing the most significant bits of the scale factor portions 4 and 5 of the registers 1 and 2 with each scale factor portion including a 5 digit binary expression.

When comparing two digital expressions in floating notation, it is necessary to compare the first two highest order bits of each of the scale factors in the registers 4 and 5 to determine if the highest order bits are identical. If the two highest order bits are not identical, the number having the highest value in the two highest order bits is read out without adding or subtracting the other expression, since, as previously pointed out, the smaller number is negligible with respect to the other.

If the highest order bits of the scale factors are identical, it is necessary to compare the remaining three bits of the scale factors, and if necessary reposition one of the two scale factor expressions to provide a complete coincidence of all bits of both scale factors.

In order to explain the operation of the comparator in detail, a typical example of each operation will now be considered. If we refer to Fig. 2 and assume that two binary expressions are fed into the registers 1 and 2 over the conductors T and W, respectively, and with the registers 1 and 2 occupied, the bits X4 and X5 of the register 1 contain "ones" and the bits Y4 and Y5 of the register 2 contain "zeros," or if one of the bits Y5 and Y4 contain a "one" and the other a "zero," it can be seen that the expression in the register 2 is insignificant with respect to the value of the expression in the register 1 and therefore no arithmetic operation can be performed. This condition exists if we assume that the bits X4 and X5 contain "ones" and the bits Y5 and Y4 contain "zeros," the conductors 6 and 7 provide a negative signal to the diodes 8 and 9, respectively, and the conductors 10 and 11 leading from the bits Y5 and Y4 provide a negative signal to the diodes 12 and 13, respectively. The energization of the diodes 8 and 12 by the bits X5 and Y5 removes ground potential from the conductor 14 allowing it to apply energy to the diode 15 which is connected to the read-out of "X" conductor or line 16 used to control the amplifier 17 to provide a read-out control to the register 1. Although the diodes 9 and 13 also lie on the single conductor 18, this conductor remains grounded through the inactive diode 19.

If we assume the other combinations of X5, Y5 and X4, Y4 that could cause a read-out of X while neglecting Y, these might be as follows. If X5 is "zero" and X4 is "one" and Y5 and Y4 are "zeros," then the diodes 9, 13 and 19 would allow energy to be applied to the conductor 18 energizing the diode 20 for energizing the conductor 16 on the reposition of "X" line SX.

If X5 is "one" and Y5 is "zero" and X4 is "zero" and Y4 is "zero," then the diodes 8 and 12 become energized by the conductors 6 and 10, respectively, causing the conductor 14 to become ungrounded, energizing the diode 15 on the reposition of "X" line 16. In each of the above cases the bits X4 and X5 have been greater than the bits Y4 and Y5 of each of the scale factors and thus the binary information in the register 1 has been read-out without being added to the binary expression of the register 2. It is also pointed out that the reposition of "X" line 16 is provided with a suitable amplifier 17 of any well-known suitable type such as a cathode follower type.

If we now assume that the expression coming in on the line W to the register 2 is greater than the expression coming in on the line T to the register 1 in the bits X4 and Y4 and Y5 and X5 of the scale factor portions, the following results will occur. If we assume that the bit Y5 is a "one" with X5 as a "zero" and Y4 a "one" with X4 is "zero," it can be seen that the conductors 26 and 27 from the bits Y5 and X5, respectively, place energy on the diodes 28 and 29, respectively, ungrounding the conductor 30 and causing energy to be applied to the read-out line 31 of register 2 through the diode 32. The other combinations that may appear are, for example, X5 and Y5 both "zero" with Y4 "one" and X4 "zero." Under this combination the conductor 33 would become energized with energy being applied through the diodes 34, 35 and 36 by the bits X5, Y4 and X4, respectively. Energization of the conductor 33, in turn, causes energy to be applied to the read-out conductor 31 for the register 2 over the diode 37. The read-out conductor 31 contains a standard amplifier 38 such as a cathode follower type capable of delivering its output into the register 2 for read-out purposes. The remaining combination would be where Y5 is "one," X5 is "zero," and X4 and Y4 are "zeros." With this combination the conductor 39 becomes energized, since the diodes 40, 41 and 42 receive energy from the bits Y5, X4 and Y4, respectively. The energizing of the conductor 39 in turn places energy on the read-out of Y to conductor 31 through the diode 43.

If we now take the condition where the bits X5, Y5 and X4, Y4 are identical, the following results occur. For example, if we assume that each of the bits X4, X5 and Y4, Y5 contain "ones," it can be seen that the conductor 44 would become energized through energy being applied to the diodes 45, 46, 47 and 48 by the bits X5, Y5, X4 and Y4, respectively. The ungrounding of the conductor 44 removes the ground from the conductor R0 by the diode 49. With R0 being active, causing the amplifier 50 to become active, the diode matrix 51 is conditioned for allowing the comparison of the bits X1, Y1 through X3, Y3 in the scale factor portions of the registers 1 and 2. This action is provided through the application of energy to the conductor 52 having connected thereto the diodes 53 through 66 located on the cross conductors 67 through 80. A comparison now takes place between the bits 1 through 3 of each of the scale factor portions of the registers 1 and 2.

For example, if we assume that each of the bits X3 through X1 and Y3 through Y1 contain "ones," it can be seen that the conductor 80 would become ungrounded through the ungrounding of the diodes 81, 82 83, 84, 85 and 86 by the bits Y3, X3, Y2, X2, Y1 and X1, respectively, the energy being supplied to the diodes 81 through 86 over the conductors 87 through 92, respectively. With all of the diodes on the line 80 being ungrounded, the diode 92 allows the application of energy to the compute line 93 connected to the adder or subtractor A with all of the five bits in the scale factor portions of the registers 1 and 2 appearing coincident. The adder A then extracts the binary information from the registers 1 and 2, combines the information and makes it available on the output conductor D. These operations can be performed by the devices illustrated in chapter IV of "Arithmetic Operations in Digital Computers" by R. K. Richards, D. Van Nostrand Company, Inc., 1955.

If we now assume that one of the bits Y1 through Y3 is a "zero" with the bits X1 through X3 appearing as "ones," it then becomes necessary to reposition the fraction portion FY in the register 2 and at the same time count the reposition steps in the scale factor portion bits Y5 through Y1 of the register 2. If, for example, Y1 is a "zero" with X3 through X1, Y3 and Y2 each containing "ones," it can be seen that a repositioning of FY takes place in the following manner. With X1 containing a "one," its conductor 94 activates the diode 95 on the conductor 72. At the same time with Y1 containing a "zero," its conductor 96 activates the diode 97 on the conductor 72, and with the R0 line being active through the comparison of the bits X5, Y5, X4 and Y4 removing the ground from the diode 58, the conductor 72 in turn becomes active and removes the ground from the diode 98 causing the repositioning line 99 to become active, energizing the gate 100. The gate 100 then provides a signal, amplified by the amplifier 101, for applying stepping energy to the conductors 102 and 103 causing the bit Y1 to be energized with a "one" at the same time that the fraction portion Fy of the register 2 is stepped to the right one place. With the scale factor portions now containing all "ones," the compute line 80 is again energized, and the information is fed out into the adder A to be utilized on the output line D.

If we now assume this condition that with the information in the scale factor bits X5, X4, Y5 and Y4 being identical energizing the line R0 with X3 containing a "zero" with the bits Y3, Y2, Y1, X2 and X1 each being "ones," the operation will appear as follows. The X3 bit applies energy to the diode 104, while the bit Y3 applies energy to the diode 105. These diodes are then connected to the common conductor 67, and with R0 energizing the diode 53, the diode 106 in turn places energy on the reposition of X line 107. This energy on the reposition line 107 causes the gate 108 to supply clock pulses through the amplifier 109 to the shift and count lines 110 and 111 causing the scale factor portion of the register 1 to step to the right as viewed from the drawing three steps until each of the bits X1 through X5 contains "ones." At the same time the shift line 110 also steps the fraction Fx to the right three places thus reducing the value of the expression by this amount. With the scale factor portion of the register 1 now containing digits coincident with the scale factor portion of the register 2, the compute line 93 becomes active through the activation of the conductor 80 in the manner previously described causing the adder A to take the expressions from the registers 1 and 2 and provide a combined expression on the output line D.

It is pointed out that any bit in the scale factor portion of either of the registers containing the largest number or expression may be a "zero," in which case the smaller scale factor would be stepped until the "ones" and "zeros" matched with the "ones" and "zeros" of the largest scale factor causing the compute line to be energized over one of the conductors 73 through 79 in a manner similar to the previously explained operation of the conductor 80. The exact conductor becoming active will depend upon the combination of "ones" and "zeros" found in the last three bits of the scale factor portion of the registers 1 and 2. It is believed that it is unnecessary to go into every operation of repositioning, since each operation is similar to the previously two described operations.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a computer, a comparator for controlling the combination of two digital expressions in floating radix form comprising a pair of digital registers for receiving said expressions and having scale factor and fraction portions, said scale factor portions comprising a plurality of signals representing the most significant digital values and a plurality of remaining signals, a first matrix means for comparing the most significant digital values of said expressions and having means to eliminate the smaller of said digital expressions when said most significant digital values are not identical, a second matrix means for comparing the remaining signals of said scale factor portions, control means connected to said matrices for activating said second matrix means when said first matrix compares identical most significant digital values, second control means for causing the smaller digital values of said scale factor portions and its associated fraction portion to be repositioned until said scale factor portion is identical to the scale factor portion of the larger digital expression, combining means connected to said registers, and a third control means connected to said second matrix for causing said digital expressions to be inserted into said combining means in response to identical remaining digits in said scale factor portions.

2. In a computer, a comparator for controlling the combination of two digital expressions in floating radix form comprising a pair of digital registers for receiving said expression and having scale factor and fraction portions, said scale factor portions comprising a plurality of signals representing the most significant digital values and a plurality of remaining digits, a first matrix means for comparing the most significant digital values of said expressions and having means to eliminate the smaller of said digital expressions when said most significant digital values are not identical, a second matrix means for comparing the remaining digital values of said scale factor portions, control means connected to said matrices for activating said second matrix means when said first matrix compares identical most significant digital values, second control means for causing the smaller of said scale factor portions and its associated fraction portion to be repositioned until said scale factor portion is identical to the scale factor portion of the larger digital expression, combining means connected to said registers, and a third control means connected to said second matrix for causing said digital expressions to be inserted into said combining means in response to identical remaining digits in said scale factor portions, said combining means being an adder.

3. In a computer, a comparator for controlling the combination of two digital expressions in floating radix form comprising a pair of digital registers for receiving said expressions and having scale factor and fraction portions, said scale factor portions comprising a plurality of signals representing the most significant digital values and a plurality of remaining signals, a first matrix means for comparing the most significant digital values to eliminate the smaller of said digital expressions when said most significant values are not identical, a second matrix means for comparing the remaining digital values of said scale factor portions, control means connected to said matrices for activating said second matrix means when said first matrix compares identical most significant digital values, second control means for causing the smaller of said scale factor portions and its associated fraction portion to be repositioned until said scale factor portion is identical to the scale factor portion of the larger digital expression, combining means connected to said registers, and a third control means connected to said second matrix for causing said digital expressions to be inserted into said combining means in response to identical remaining digits in said scale factor portions, said first matrix means being a plurality of diodes.

References Cited in the file of this patent

UNITED STATES PATENTS

| | | |
|---|---|---|
| 2,538,636 | Williams | Jan. 16, 1951 |
| 2,749,440 | Cartwright | June 5, 1956 |